United States Patent [19]

Krause

[11] Patent Number: 5,175,427

[45] Date of Patent: Dec. 29, 1992

[54] SPIKE-FREE OPTOELECTRONIC AMPLIFIER HAVING A MULTIPLEXER AT ALL TIMES BEING ELECTRICALLY SEPARATED FROM THE OUTPUT OF A SWITCH DEVICE

[75] Inventor: Gerhard Krause, Rosenheim/Egarten, Fed. Rep. of Germany

[73] Assignee: Steinheil Optronik GmbH, Ismaning, Fed. Rep. of Germany

[21] Appl. No.: 595,369

[22] Filed: Oct. 10, 1990

[30] Foreign Application Priority Data

Oct. 10, 1989 [DE] Fed. Rep. of Germany ....... 3933823

[51] Int. Cl.⁵ ............................................. H01J 40/14
[52] U.S. Cl. ............................. 250/214 R; 250/214 A
[58] Field of Search ............ 250/208.1, 208.3, 214 A, 250/214 SW, 214 R; 307/141.8; 358/213.12, 213.18, 213.16, 213.31, 212.11

[56] References Cited

U.S. PATENT DOCUMENTS

| | | | |
|---|---|---|---|
| 4,335,406 | 6/1982 | Ohba et al. | 358/213.18 |
| 4,567,363 | 1/1986 | Goodnough | 250/214 A |
| 4,819,071 | 4/1989 | Nakamura | 358/213.12 |

Primary Examiner—David C. Nelms
Assistant Examiner—Que T. Le
Attorney, Agent, or Firm—Kanesaka & Takeuchi

[57] ABSTRACT

A optoelectronic circuit arrangement, for instance for thermal viewing equipment, comprises a plurality of independent photodetector elements, whose signals are combined by multiplexers. The multiplexer output is connected with the common input of a switched integrator, which applies integrated signals to an output switch device, steps being taken to ensure that the multiplexer is at all times electrically separated from the output of the output switch device. For this purpose the integrator has at least one channel with three electronic switching members which in a cyclic sequence perform the operations of "integration", "output of integral value to output" and "erase integral value".

17 Claims, 1 Drawing Sheet

SPIKE-FREE OPTOELECTRONIC AMPLIFIER HAVING A MULTIPLEXER AT ALL TIMES BEING ELECTRICALLY SEPARATED FROM THE OUTPUT OF A SWITCH DEVICE

BACKGROUND OF THE INVENTION

The invention relates to an optoelectronic circuit arrangement, as for instance for thermal viewing equipment, comprising a plurality of independent photodetector elements whose signals are combined by multiplexing means.

Circuitry of this type has already been proposed, in which the signals of the photodetector elements are combined and the output signals of the multiplexing means are amplified. A disadvantage with such a system is that the amplifiers are saturated by spikes.

SHORT SUMMARY OF THE PRESENT INVENTION

Accordingly one object of the present invention is to devise circuitry of the above described type, in which saturation of the amplifiers is precluded, that is to say spikes or interfering surges of the type produced more particularly by electronic switches are essentially prevented.

The invention is based on the principle of it being possible to convert the defects caused by spikes into offset potentials, which are more readily coped with, as is in fact disclosed in the prior German patent application number P 38 27 465.5 dated Dec. 8, 1988 or, respectively, the corresponding European patent application 89 114 285.3 dated Feb. 8, 1989 with the same priority, and the U.S. patent application of Apr. 8, 1989 with the same priority date.

On the basis of the principle the said object of the invention is to be attained in that the multiplexer output is connected with the common input of a switched integrator, which applies the integrated signal to an electronic output circuit device, steps being taken to ensure that there is no connection, that is to say there is an electrical separation, between the multiplexer and the output of the output switch at any time.

Further features and advantages of the invention will be gathered from the claims and the ensuing detailed description of several embodiments thereof referring to the drawings.

LIST OF THE SEVERAL VIEWS OF THE DRAWINGS

DETAILED DESCRIPTION OF WORKING EMBODIMENTS OF THE INVENTION

Figure 1:
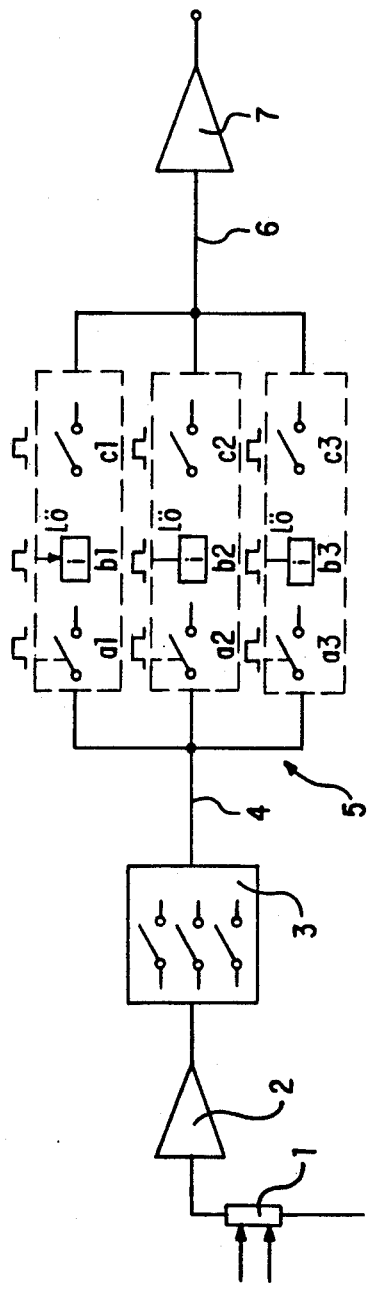
FIG. 1 is a diagrammatic circuit in accordance with a first form of the invention.

In FIG. 1 the photodetector, which is made up of a plurality individual detector elements, as for instance 288, is referenced 1. The signals of the detector elements are amplified by a corresponding number of preamplifiers 2. The signals from the detector elements 1 amplified in this manner pass to a multiplexer 3, which in the present case will have a single channel output 4, which is connected with the common input of a switched integrator 5. The common output 6 of this integrator 5 is for instance connected with an output amplifier 7.

The switched integrator in accordance with the invention in the present case has three channels, which are connected together at their input and output ends. In each channel there is a number of electronic switches, which consecutively perform the operations of "integration", supply of an integral at the output" and "erase integral". These switches are denoted in channel 5.1 as $a_1$, $b_1$ and $c_1$, in channel 5.2 as $a_2$, $b_2$ and $c_2$ and in channel 5.3 as $a_3$, $b_3$ and $c_3$. The operations are performed in a cyclical order. In this respect the operations are cyclically shifted in the individual channels in relation to each other.

The arrangement is designed to ensure there is at no point in time a connection between the multiplexer 3 and the outputs of the output switches $c_1$, $c_2$ and $c_3$.

If the scan time of an individual detector is equal to the time t, then in a respective channel integration will be performed for the time t and then for the time t the signal will be switched to the output and lastly for the time t the signal will be erased. The consecutively following switching pulses P1, P2 and P3 are associated with the elements $a_1$, $b_1$ and $c_1$ in the channel 5.1 as follows:

$$a_1(P1),\ b_1(P3),\ c_1(P2).$$

In a corresponding manner the switching pulses P1, P2 and P3 are associated with the elements in the channels 5.2 and 5.3 as follows:

$$a_2(P2),\ b_2(P1),\ c_2(P3)\ \text{and}$$

$$a_3(P3),\ b_3(P2),\ c_3(P1).$$

It follows from this that the operations in the individual channels are cyclically shifted in relation to each other.

Figure 2:
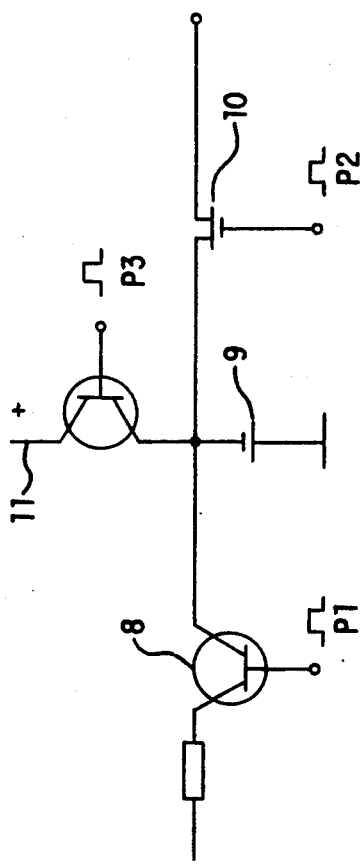
FIG. 2 shows a circuit for one channel of the integrator used in FIG. 1.

The elements of one channel of the integrator in accordance with the invention and the circuitry connecting them are shown in more detail for one embodiment of the invention in FIG. 2 so that as regards the circuit reference should be had to this FIG. 2.

The electronic input switch 8 with the capacitor 9 constitutes the integrating member. The electronic output switch is referenced 10 and the erasing member is referenced 11. The input switch 8 and the erasing member 11 may for instance be bipolar transistors. The output switch 10 is a field effect transistor with a very low capacitance. In this arrangement the input switch 8 plays the role of a power supply for the integrating member.

The integration member is embodied in the form of a bipolar transistor, since the incoming spikes may be relatively high. The erase signals of the erasing member 11 may be very short. During integration the areas of the spike defects are integrated as well so that the integral switched to the output switch 10 is freed of spikes. The defect in the integral acts as an offsetting potential (see said prior German patent application P 38 27 465.5 dated Dec. 8, 1988, which is substantially simpler to process than the high spike defects as produced in multiplexers, for instance. In FIG. 2 the three switching pulses are plotted as P1, P2 and P3.

The invention is not restricted to a three-channel integrator. The effect obtainable with a three-channel integrator is also possible with a dual-channel one and in an extreme case with a single channel integrator. In the case of "n" channels for n equal to 1, 2, 3 . . . the overall time, in which all individual operations are performed in one channel, is equal to n·t, t being the scan time of a detector.

Figure 3:
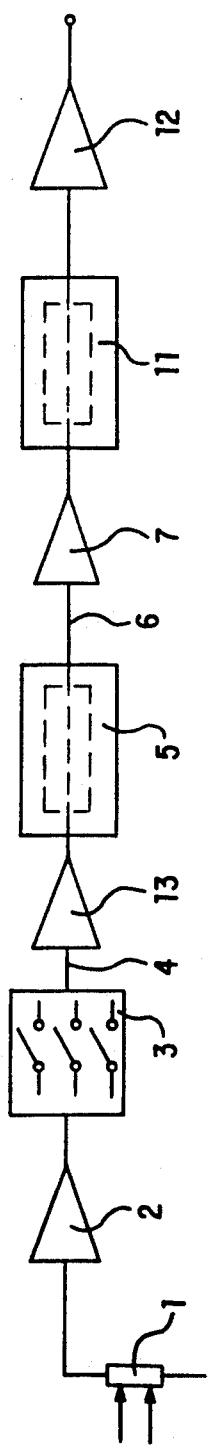
FIG. 3 shows a circuit with two integrators.

The embodiment of the invention shown in FIG. 3 differs from that of FIG. 1 since the amplifier 7 is followed by a further integrator 11 in accordance with the integrator 5, whose output is connected with a further amplifier 12. Furthermore, the integrator is preceded by an amplifier 13.

The integrators 5 and 11 act not only as a means suppressing the spike defects but also as low pass filters. In this respect the low pass filter effect is particularly significant in the case of the second integrator 11. Both in FIG. 1 and also in FIG. 3 it is possible for the preamplifier 2 to be omitted if it is for instance a question of normal viewing equipment. It is more especially in the case of thermal viewing equipment that the amplifiers 2 are expedient.

I claim:

1. An optoelectronic circuit arrangement, comprising a plurality of independent photodetector elements and multiplexer means for combining signals from said photodetector elements, characterized by a switched integrator, means for connecting an output of the multiplexer means with a common input of said switched integrator, which is adapted to apply the integrated signal to an electronic output circuit device, and by means to ensure that the multiplexer is electrically separated from the output of the output switch at all times.

2. The circuit arrangement as claimed in claim 1, characterized in that the integrator with a common input and a common output has at least one channel with a plurality of electronic switching members, which are adapted to perform in cyclical succession the operations of integration, supply of an integral at the output and erase integral.

3. The circuit arrangement as claimed in claim 2, characterized in that the integrator comprises a plurality of channels each with a plurality of electronic switches, the operations being cyclically shifted in relation to each other in the individual channels.

4. The circuit arrangement as claimed in claim 1, characterized in that the scan time of an individual detector is determined by the time, characterized in that in the case of n channels for n equal 1, 2, 3 . . . the overall time, in which all individual operations are performed in one channel, is equal to n·t.

5. The circuit arrangement as claimed in claim 4, characterized in that the integrator has three channels and in that in one respective channel integration is performed for a duration, then for the said duration the signal is switched to the output and then for the said duration the integrated signal is erased.

6. The circuit arrangement as claimed in claim 1, characterized in that the integrator is switched between a pre-amplifier and an output amplifier.

7. The circuit arrangement as claimed in claim 1, characterized in that a plurality of integrators are connected in tandem and are separated from each other by amplifiers.

8. The arrangement as claimed in claim 7, characterized by at least two such integrators said second integrator being additionally adapted to function as a low pass filter for suppression of interfering spikes.

9. The arrangement as claimed in claim 1, characterized in that each channel of the integrator comprises an integrating element made up of a power supply and a storage means and furthermore an electronic output switch and electronic erase element.

10. The circuit arrangement as claimed in claim 9, characterized in that the power supply and the erase element are respectively a bipolar transistor and the output switch is a field effect transistor.

11. The circuit arrangement as claimed in claim 1, characterized in that it is embodied in an thermal viewing device.

12. A spike-free optoelectronic amplifier comprising:
a plurality of independent photodetectors for converting optical signals to electrical signals;
a multiplexer connected to said photodetectors for combining said electrical signals; and
a switched integrator connected to an output of said multiplexer for converting a spike or surge generated by said multiplexer into an offset potential thereby ensuring that said multiplexer is separated from a subsequent electrical circuit in terms of said spike or surge.

13. The spike-free optoelectronic amplifier of claim 12, wherein said switched integrator comprises a bipolar transistor connected to said multiplexer and having an integration capacitor in an emitter-collector circuit thereof for integrating said electrical signals.

14. The spike-free optoelectronic amplifier of claim 13, wherein said switched integrator further comprises a second bipolar transistor connected to said capacitor in an emitter-collector circuit thereof for periodically discharging said capacitor.

15. The spike-free optoelectronic amplifier of claim 14, wherein said switched integrator further comprises an FET transistor connected to said capacitor in a source-drain circuit thereof to function as an output switch.

16. The spike-free optoelectronic amplifier of claim 12, which further comprises an output amplifier connected to an output of said switched integrator.

17. The spike-free optoelectronic amplifier of claim 16, which further comprises a second switched integrator connected to an output of said output amplifier.

* * * * *